United States Patent
Yoshino et al.

(10) Patent No.: US 12,276,123 B2
(45) Date of Patent: Apr. 15, 2025

(54) DISMANTLING METHOD OF TOWER-TYPE WIND POWER GENERATION SYSTEM

(71) Applicant: BESTERRA CO., LTD., Tokyo (JP)

(72) Inventors: Yoshihide Yoshino, Tokyo (JP); Masaharu Takemoto, Tokyo (JP)

(73) Assignee: BESTERRA CO., LTD., Tokyo (JP)

( * ) Notice: Subject to any disclaimer, the term of this patent is extended or adjusted under 35 U.S.C. 154(b) by 188 days.

(21) Appl. No.: 18/016,996

(22) PCT Filed: Jul. 20, 2020

(86) PCT No.: PCT/JP2020/028099
§ 371 (c)(1),
(2) Date: Jan. 19, 2023

(87) PCT Pub. No.: WO2022/018797
PCT Pub. Date: Jan. 27, 2022

(65) Prior Publication Data
US 2024/0026698 A1  Jan. 25, 2024

(51) Int. Cl.
*E04G 23/06* (2006.01)
*F03D 13/00* (2016.01)
*F03D 80/00* (2016.01)

(52) U.S. Cl.
CPC ............. *E04G 23/06* (2013.01); *F03D 13/00* (2016.05); *F03D 80/011* (2023.08); *F05B 2230/60* (2013.01); *F05B 2230/70* (2013.01)

(58) Field of Classification Search
CPC ...... F05B 2230/70; E04G 23/06; F03D 13/00; F03D 80/011; E04H 12/08534; E04H 12/3248
See application file for complete search history.

(56) References Cited

U.S. PATENT DOCUMENTS 9,238,923 B2 *  1/2016  Arlaban Gabeiras .................. E04H 12/342
9,657,495 B2 *  5/2017  Lockwood ............ B66C 23/207
(Continued)

FOREIGN PATENT DOCUMENTS

DE  202012102170 U1 *  8/2012  ............. F03D 1/001
DE  102022126929 B3 *  2/2024
(Continued)

OTHER PUBLICATIONS

International Search Report for PCT/JP2020/028099 (PCT/ISA/210) mailed on Oct. 6, 2020.

*Primary Examiner* — Kyle J. Walraed-Sullivan
(74) *Attorney, Agent, or Firm* — Birch, Stewart, Kolasch & Birch, LLP

(57) ABSTRACT

Provided is a dismantling method of a tower-type wind power generation system in which scaffolding is not required around a tower body. After climbing on a work bench set outside an outer wall of a tower body and removing a lower end part of an upward-tapering part in an upper end part of the tower body over the entire periphery of the tower body, the tower body is removed from an uppermost part of a cylindrical part of the tower body below the upward-tapering part to dismantle the tower body from the top. The remaining upward-tapering part of the tower body is supported by a jack provided in an inner column while being lowered, along with the dismantling, into an internal cavity of the cylindrical part of the tower body and is placed on a placement protrusion provided on an inner wall of the tower body.

11 Claims, 8 Drawing Sheets

(56) References Cited

U.S. PATENT DOCUMENTS

| | | | | |
|---|---|---|---|---|
| 2007/0290426 | A1* | 12/2007 | Trede | F03D 80/70 269/1 |
| 2011/0168654 | A1* | 7/2011 | Ahler | F03D 13/10 212/199 |
| 2012/0119505 | A1* | 5/2012 | Hayashi | F03D 80/82 290/55 |
| 2014/0102039 | A1* | 4/2014 | Wagner | F03D 80/50 52/745.18 |
| 2014/0311085 | A1* | 10/2014 | Fernandez Gomez | F03D 13/25 52/745.18 |
| 2015/0167342 | A1* | 6/2015 | Montaner Fraguet | B66C 23/32 52/745.18 |
| 2016/0237985 | A1* | 8/2016 | Bögl | B66C 23/185 |
| 2017/0022966 | A1* | 1/2017 | Therkildsen | F03D 80/88 |
| 2017/0045029 | A1* | 2/2017 | Senthoorpandian | F03D 1/0675 |
| 2017/0175434 | A1* | 6/2017 | De los Rios Leiva | F03D 13/20 |
| 2018/0290864 | A1* | 10/2018 | Garitaonandia Aramberri | E04H 12/348 |
| 2020/0071949 | A1* | 3/2020 | Yoshino | E04G 23/08 |
| 2020/0102193 | A1* | 4/2020 | Strandberg | B66C 23/185 |
| 2021/0178532 | A1* | 6/2021 | Yoshino | F03D 13/10 |
| 2022/0251866 | A1* | 8/2022 | Hofmann | E04G 23/082 |
| 2023/0365383 | A1* | 11/2023 | Chea | F03D 13/10 |
| 2024/0026698 | A1* | 1/2024 | Yoshino | E04G 3/30 |
| 2024/0060476 | A1* | 2/2024 | Sørensen | F03D 80/504 |
| 2024/0093761 | A1* | 3/2024 | Holland | F16H 57/082 |
| 2024/0200354 | A1* | 6/2024 | Lagerweij | B66C 23/88 |
| 2024/0301863 | A1* | 9/2024 | Podhola | F03D 1/025 |
| 2024/0301873 | A1* | 9/2024 | Kirkegaard | F03D 80/301 |

FOREIGN PATENT DOCUMENTS

| | | | | |
|---|---|---|---|---|
| EP | 4386203 A1 * | 6/2024 | | B66C 23/207 |
| IN | 201402187 I4 * | 1/2015 | | F03D 1/0675 |
| JP | 2000034833 A * | 2/2000 | | E04G 3/24 |
| JP | 2000145126 A * | 5/2000 | | E04G 3/24 |
| JP | 2010-242362 A | 10/2010 | | |
| JP | 2012-102692 A | 5/2012 | | |
| JP | 2016-94734 A | 5/2016 | | |
| WO | WO-2010034288 A2 * | 4/2010 | | B66D 1/60 |
| WO | WO-2011095729 A2 * | 8/2011 | | E02D 27/42 |
| WO | WO-2017108049 A1 * | 6/2017 | | F03D 1/02 |
| WO | WO-2018178409 A1 * | 10/2018 | | B66C 23/185 |
| WO | WO-2019116511 A1 * | 6/2019 | | B23P 19/04 |

* cited by examiner

DISMANTLING METHOD OF TOWER-TYPE WIND POWER GENERATION SYSTEM

TECHNICAL FIELD

The present invention relates to a dismantling method of a wind power generation system, and particularly to a dismantling method of a tower-type wind power generation system.

BACKGROUND ART

As described in the following Patent Document 1, for example, a tower-type wind power generation system often includes a wind power generator in an upper end part of a tower body. Additionally, the inside of the tower body is hollow with a circular section. In order to pursue wind power generation efficiency, such a tower-type wind power generation system is set up in various locations where the average wind speed is high, the wind direction is stable, and where there is less turbulence, that is, a point with good wind conditions such as the top of a mountain or at sea (offshore).

The life of such a tower-type wind power generation system is supposed to be 20 to 30 years (useful life in Japan is 17 years). A tower-type wind power generation system that reaches the end of its life or useful life is dismantled as in the case of other power generation systems. In some cases, an accident or failure may occur due to a lightning strike, a typhoon, or the like, and the tower-type wind power generation system may be dismantled before the end of its life. In a conventional dismantling method of a tower-type wind power generation system, as in the case of a construction method at the time of construction, scaffolding is built around the tower, a large crane is driven or transported to the vicinity of the power generation system, and the wind power generator and the tower body are dismantled using the large crane.

PRIOR ART DOCUMENT

Patent Document

Patent Document 1: JP-A-2012-102692

SUMMARY OF INVENTION

Problems to be Solved by the Invention

However, the dismantling work of a tower-type wind power generation system using a large crane has problems such as high cost accompanying the use of the large crane, transportation of the large crane, and transportation of a large amount of equipment and material such as scaffolding. Further, a wide working area is required to freely use the large crane. Additionally, since a tower-type wind power generation system is normally set up in a location where there is strong wind, with a large crane that is vulnerable to strong wind, the dismantling operation is frequently forced to stop. Specifically, according to the Safety Ordinance of Cranes, the operation is stopped when an average wind speed of 10 m or more continues for 10 minutes.

With the higher output in recent years, tower-type wind power generation systems are upsizing even more, and among the tower-type wind power generation systems that reach the end of their life or useful life and need to be dismantled, those shaped such that only an upper end part of the tower body tapers upward and a part therebelow is cylindrical, or those shaped such that the entire tower body tapers upward are targeted for dismantling.

The present invention has been made in view of the foregoing, and aims to provide a dismantling method of a tower-type wind power generation system that enables dismantling of a tower body having an upward-tapering part in an upper end part thereof without using a large crane or building scaffolding around the tower, and also achieves reduction of the construction period.

Means for Solving the Problems

To achieve the above object, a dismantling method of a tower-type wind power generation system of the present invention is a dismantling method of a tower-type wind power generation system including a hollow tower body and a wind power generator provided in an upper end part of the tower body, an upward-tapering part provided in the upper end part of the tower body, the method including: an inner column building step of building an inner column extending to an upper side of a lower end part of the upward-tapering part inside an internal cavity of the tower body; a tower body-upper part supporting step of applying an upward supporting force equal to or larger than a load of the entire system above the upward-tapering part to the upward-tapering part by a jack provided in an upper part of the inner column via an abutting support member that abuts on a predetermined position on an inner wall of the upward-tapering part of the tower body; a work bench setting step of suspending a work bench on which a worker can climb and perform work from an upper part of the tower body in a liftable manner; a tapering part-lower part removal step of cutting and removing, over the entire periphery of the tower body, a predetermined region lower than an abutting position of the abutting support member of the upward-tapering part in the supported state by an operation on the work bench; a tapering part lowering and placing step of, after the tapering part-lower part removal step, lowering and placing, by the jack, the remaining upward-tapering part on a placement protrusion on which the entire system above the upward-tapering part is placeable provided in a protruding manner on an inner wall of the tower body remaining on the lower side; an uppermost part of lower part removal step of using the work bench to cut and remove a predetermined range of an uppermost part of the tower body remaining on the lower side over the entire periphery of the tower body after the tapering part-lower part removal step; an inner column shortening step of removing a lower end part of the inner column in a state where the inner column is suspended from the remaining upward-tapering part and lowering the inner column from which the lower end part is removed on a ground in the internal cavity; and a lowering and removal repeating step of repeating the tapering part lowering and placing step, the uppermost part of lower part removal step, and the inner column shortening step.

According to this configuration, in a state where the upward-tapering part in the upper end part of the tower body is supported by the jack in an upper part of the inner column via the abutting support member, when a predetermined region of the upward-tapering part lower than an abutting position of the abutting support member is cut and removed while climbing on the work bench suspended from the upper part of the tower body, the remaining upward-tapering part on the upper side is separated from the tower body on the lower side. When the separated remaining upward-tapering part is lowered by the jack and its lower end part is placed on the placement protrusion provided in a protruding manner on the inner wall of the remaining tower body, the lower part of the remaining upward-tapering part is stored in the remaining tower body. Hence, collapsing of the upward-tapering part is prevented, and the load of the upward-tapering part is received by the remaining tower body, so that the upward-tapering part is supported stably. In that state, the predetermined range of the uppermost part of the remaining tower body is removed over the entire periphery of the tower body on the work bench, and along with this operation, the lower end part of the inner column is removed while suspending the inner column from the remaining upward-tapering part and then the inner column is lowered to the ground in the internal cavity. By repeating this with lowering of the remaining upward-tapering part, it is possible to sequentially dismantle the remaining tower body from the top. As a result, when the remaining upward-tapering part is lowered to the ground, the upward-tapering part may be dismantled or carried out to complete the dismantling of the tower-type wind power generation system. During this operation, there is no need to use a large crane, and both the remaining tower body and the remaining upward-tapering part are stable. Accordingly, there is no difficulty in the dismantling operation, there is no need to stop the dismantling operation frequently, and dismantling can be done by a simple operation, whereby the work period can be shortened.

Another configuration of the present invention is characterized in that the uppermost part of lower part removal step includes a step of coupling the remaining tower body upper end part and an upper end part of the remaining tower body of the lower part by a coupling member.

According to this configuration, by coupling the remaining tower body upper end part and the upper end part of the remaining tower body by the coupling member, collapsing of the remaining tower body upper end part is prevented and stability is ensured.

Another configuration of the present invention is characterized in that the work bench setting step sets the work bench over the entire outer periphery of the tower body.

According to this configuration, when dismantling the tower body on the work bench from outside the tower body, the work environment is stabilized and the dismantling operation can be performed efficiently.

Another configuration of the present invention is characterized by further including an opening forming step of forming an opening for carrying in equipment in a lower end part of the tower body before the inner column building step.

According to this configuration, it is possible to carry in the inner column members and the jack from the opening for carrying in equipment, and building of the inner column in the tower body and setting (movement) of the jack to the upper part of the inner column can be facilitated.

Another configuration of the present invention is characterized in that in a case where an upward-tapering part is provided only in an upper end part of the tower body and a part below the upward-tapering part is cylindrical, the predetermined region includes a part below a connection part between the upward-tapering part and the cylindrical part of the tower body.

According to this configuration, the upward-tapering part of the upper end of the tower body and the cylindrical part provided immediately therebelow are often coupled together via flanges protruding into the tower from the inner wall of the tower body. By performing removing by including the lower part of the connection part, it is possible to remove the flanges protruding into the tower. As a result, when lowering the remaining upward-tapering part into the cylindrical part, it can be lowered smoothly while avoiding interference with the flanges.

Effects of Invention

As described above, according to the present invention, there is no need to build scaffolding from below, there is no need to use a large crane, there is no need to stop the dismantling operation frequently, and the work period for the dismantling of the tower-type wind power generation system can be shortened. Hence, the cost of dismantling work of the tower-type wind power generation system can be reduced.

MODE FOR CARRYING OUT THE INVENTION

Figure 1:
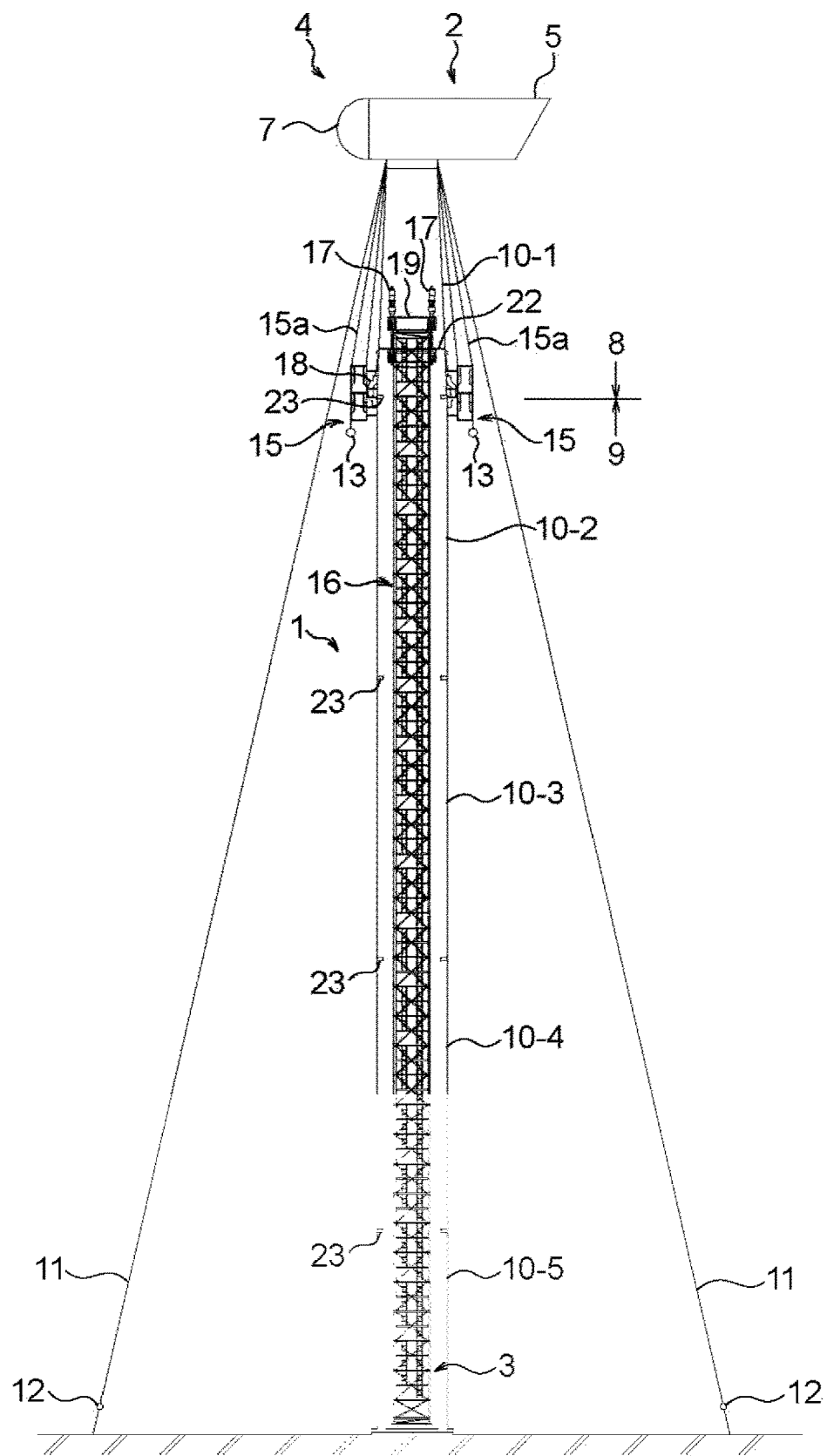
FIG. 1 is a schematic configuration of a partially sectional front view illustrating an embodiment of a tower-type wind power generation system to which a dismantling method of a tower-type wind power generation system of the present invention is applied.

Hereinafter, an embodiment of a dismantling method of a tower-type wind power generation system of the present invention will be described in detail with reference to the drawings. FIG. 1 is a partially sectional front view illustrating a state before dismantling of a tower-type wind power generation system to which a dismantling method of the present embodiment is applied. Note that while blades 6 (see FIG. 2) described later are omitted from FIG. 1, the blades 6 may be removed before dismantling, be left as they are, or be cut and removed from a middle part thereof, for example. As in the case of a known tower-type wind power generation system, this tower-type wind power generation system includes a wind power generator 2 in an upper end part of a tower body 1, and generally, the inside of the tower body 1 is an internal cavity 3 having a circular section. The internal cavity 3 of the tower body 1 is originally provided with a ladder, an elevator, or the like (not illustrated), for staff performing maintenance and inspection of the wind power generator 2 to climb, for example. While the height and size of the tower body 1 varies depending on the site of the wind power generation system, for example, the height of the tower body 1 of the embodiment is 85 m at the central position of a hub 7. The size of the tower-type wind power generation system, particularly the tower body 1, will be described later. Note that in a case where there is a partial blockage in the internal cavity 3 of the tower body 1, the blockage is removed to achieve continuity of the internal cavity 3.

Figure 2:
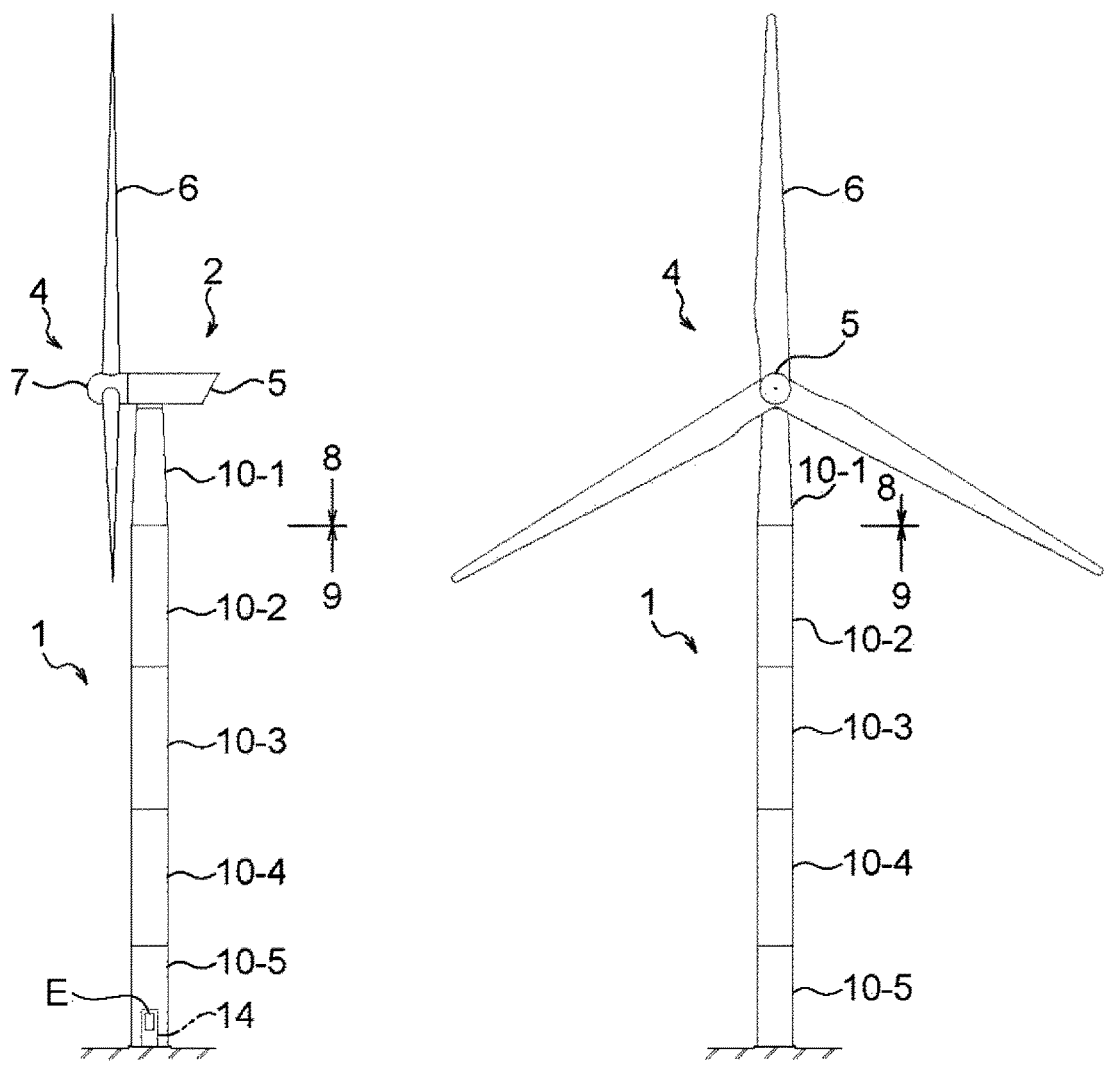
FIG. 2 is an explanatory view of the tower-type wind power generation system of FIG. 1.

FIG. 2 is an explanatory view before dismantling of the tower-type wind power generation system of FIG. 1, where FIG. 2(*a*) is a front view and FIG. 2(*b*) is a right side view. The wind power generator 2 at the top of the tower body 1 has a rotor 4 and a nacelle 5. The rotor 4 is a rotor of the wind power generator 2, and the nacelle 5 is a storage part (case) that stores main equipment of the wind power generator 2. The rotor 4 is formed by including the blades 6 that form blades of a wind turbine, the hub 7 for connecting the blades 6 to a main shaft, and the like. The hub 7 is covered with a rotor cover. The nacelle 5 mainly stores a transmission that increases the rotational speed of the main shaft, a power generator that generates power from the rotating shaft with increased speed, and the like. Additionally, a yaw adjustment system (not illustrated) that adjusts the orientation of the rotor 4, that is, the yaw axis of the nacelle 5 as a whole is provided below the nacelle 5. Moreover, a power conversion system (not illustrated) that converts power generated in the power generator into power suitable for the system and the like are also arranged in a lower part of the tower body 1.

As is clear from FIG. 2, the tower-type wind power generation system of the embodiment tapers upward only at the upper end part of the tower body 1, and a part therebelow is cylindrical. While the tower body 1 is built so as to stack a total of five tubular tower body members 10 in the embodiment, among these members, the lower four tubular tower body members 10-2 to 10-5 are cylindrical, and only the uppermost tubular tower body member 10-1 has a circular truncated cone shape tapering upward, and its internal cavity 3 also tapers upward. Specifically, the tower body 1 is cylindrical up to the height of 66 m from ground, and the part above this point tapers upward. The outer diameter of the tower body 1 in a cylindrical part 9 of the embodiment is 4.3 m, and the diameter of the top part of the tower body 1, that is, the diameter of the tower body immediately below the nacelle 5 is 3.0 m. Incidentally, the length of the blade 6 is about 43 m, and the maximum height of the tower-type wind power generation system including the blade 6 is about 129 m. Note that these sizes (dimensions) are mere examples. Additionally, the tubular tower body member 10 has a so-called iron shell structure including a steel sheet of about 20 mm to 40 mm.

As mentioned earlier, the life of a tower-type wind power generation system is 20 to 30 years, its usable life in Japan is 17 years, and a tower-type wind power generation system that reaches the end of its life or usable life is dismantled. FIG. 2 illustrates a state before dismantling of the tower-type wind power generation system of the embodiment. In an operation which is substantially preparation of the dismantling work, an opening 14 for carrying in equipment is formed in a lower end part of the tower body 1 (opening forming step). In the dismantling method of the embodiment, an inner column member equipped with a jack for supporting an upward-tapering part 8 of the tower body 1 described above and the jack itself need to be carried into the internal cavity 3 of the tower body 1. Although an entrance E large enough for a person to enter is provided in the lower end part of the tower body 1 in general, it is difficult to carry equipment (equipment members) into the internal cavity 3 from the entrance E. For this reason, the opening 14 large enough for carrying in equipment (equipment members) is formed by widening the entrance E, for example, and the periphery of the opening is reinforced if necessary. Additionally, in the embodiment, prior to the dismantling operation, in order to prevent collapsing of the tower body 1 during dismantling, a lower end part of a wire rope 11 for collapse prevention coupled to the upper end part of the tower body 1 is fixed to the ground as illustrated in FIG. 1, for example. An automatic tension adjuster 12 is inserted into the wire rope 11 for collapse prevention, for example, so that a constant tension acts on the wire rope 11 for collapse prevention. Note that the wire rope 11 for collapse prevention of the tower body will be omitted in the following description.

Figure 3:
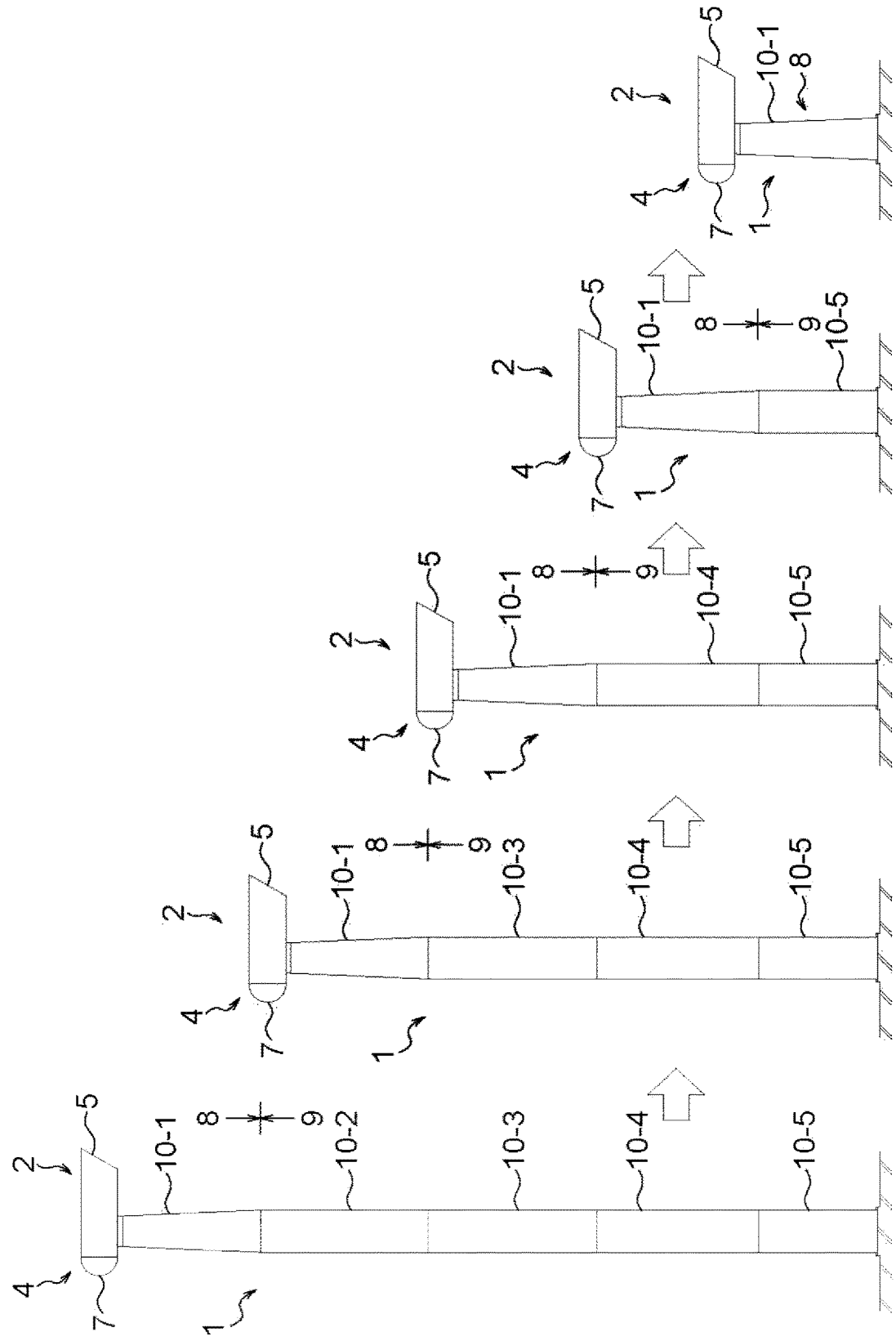
FIG. 3 is an explanatory view of an outline of a dismantling method of the tower-type wind power generation system of FIG. 1.

FIG. 3 is an explanatory view illustrating an outline of the dismantling method of a tower-type wind power generation system of the embodiment, where dismantling progresses in order from the left side of FIG. 3. In the dismantling method, a lower end part (predetermined region) of the upward-tapering part 8 in the upper end part of the tower body 1 including a connection part between the upward-tapering part 8 and the cylindrical part 9 is cut and removed (tapering part-lower part removal step). As will be described later, the operation is performed from the outside of the tower body 1 on a work bench 15 suspended outside an outer wall of the tower body 1. As illustrated in FIG. 1, for example, the cut and removed dismantled object is lowered from the outside of the tower body 1 using a lift 13 attached to the work bench 15. When the lower end part of the upward-tapering part 8 is removed, the remaining upward-tapering part 8 is cut off from the lower cylindrical part 9. Hence, while lowering the upward-tapering part 8 into the internal cavity 3 of the cylindrical part 9 (tapering part lowering and placing step), the uppermost part of the remaining cylindrical part 9 is cut and removed (uppermost part of lower part removal step), and the resultant dismantled object is lowered from the outside of the tower body 1 using the lift 13, for example. Moreover, in the embodiment, along with these operations, a step (inner column shortening step) of sequentially removing lower end parts of an inner column 16 described later and gradually shortening the inner column 16 is also performed. Then, by repeating these steps (lowering and removal repeating step), the top tubular tower body member (tubular tower body member described above) 10-2, the second-from-top tubular tower body member 10-3, the third-from-top tubular tower body member 10-4, and the tubular tower body member 10-5 at the bottom can be dismantled in this order. The upward-tapering part 8 (upward-tapering tubular tower body member 10-1) lowered to the ground is dismantled at the end. Note that since the upward-tapering part 8 lowered to the ground is placed in a sufficiently low position or is sufficiently small, it may be carried out using heavy equipment such as a small crane without dismantling. Additionally, the aforementioned ladder, elevator, or the like provided in the internal cavity 3 of the tower body 1 is taken out at an appropriate timing. The lift 13 may be attached to the wind power generator 2 (nacelle 5), for example. The lift 13 is omitted from the following drawings.

The remaining upward-tapering part 8 is supported from the inside of the tower body 1. For this reason, in the internal cavity 3 of the tower body 1, the inner column 16 continuing from a lower end region of the tower body 1 to a region below the wind power generator 2 is erected (inner column building step), and the remaining upward-tapering part 8 is supported with a jack 17 provided in the inner column 16. The jack 17 is attached to an upper end part of the inner column 16, for example. The inner column 16 has its name because it supports the jack 17 in the vicinity of an upper end part inside a tube. However, in reality, a foldable scaffolding member 16*a* is used (see FIG. 4 and other drawings), for example, and while the scaffolding member 16*a* is suspended by a lift (not illustrated) attached to the upward-tapering part 8, for example, a separate scaffolding member 16a is added to a lower end part of the scaffolding member 16a, and by consecutively repeating this operation, the inner column 16 is built in the internal cavity 3 of the tower body 1. Accordingly, since the inner column 16 is formed of the scaffolding member 16a, it is also possible to perform various operations on the scaffolding member 16a inside the tower. A method of supporting the remaining upward-tapering part 8 will be described later.

Additionally, along with or before or after the inner column building step, the work bench 15 is suspended outside the outer wall of the tower body 1 (work bench setting step). The work bench 15 is for workers to climb on and perform dismantling operations, and is suspended in a liftable manner from an upper part of the tower body 1, that is, an upper end part of the upward-tapering part 8 or the wind power generator 2 (nacelle 5). Moreover, in the embodiment, as will be described later, the work bench 15 is provided over the entire outer periphery of the tower body 1. In the dismantling method of a tower-type wind power generation system of the embodiment, generally, the cylindrical part 9 is dismantled from the outside of the tower body 1 and this operation is repeated consecutively while moving downward. Hence, the work bench 15 that is lowered along with this operation and is provided over the entire outer periphery of the tower body 1 can have a constant inner diameter. That is, the work bench 15 that is once set is gradually lowered in that state along the cylindrical part 9 to be set in a dismantling position. In the embodiment, the work bench 15 surrounding the entire outer periphery of the tower body 1 is suspended from the wind power generator 2 (nacelle 5) or the upper end part of the upward-tapering part 8 with a wire rope 15a and is fixed to the outer wall of the tower body 1, as illustrated in FIG. 1, for example. The work bench 15 may be assembled on the ground so as to surround the entire outer periphery of the tower body 1, for example, and be suspended with a lift attached to the wind power generator 2 (nacelle 5) to be set in the dismantling location, for example. Alternatively, a work bench member may be suspended from a part of the wind power generator 2 and be assembled and built at the dismantling location.

Figure 4:
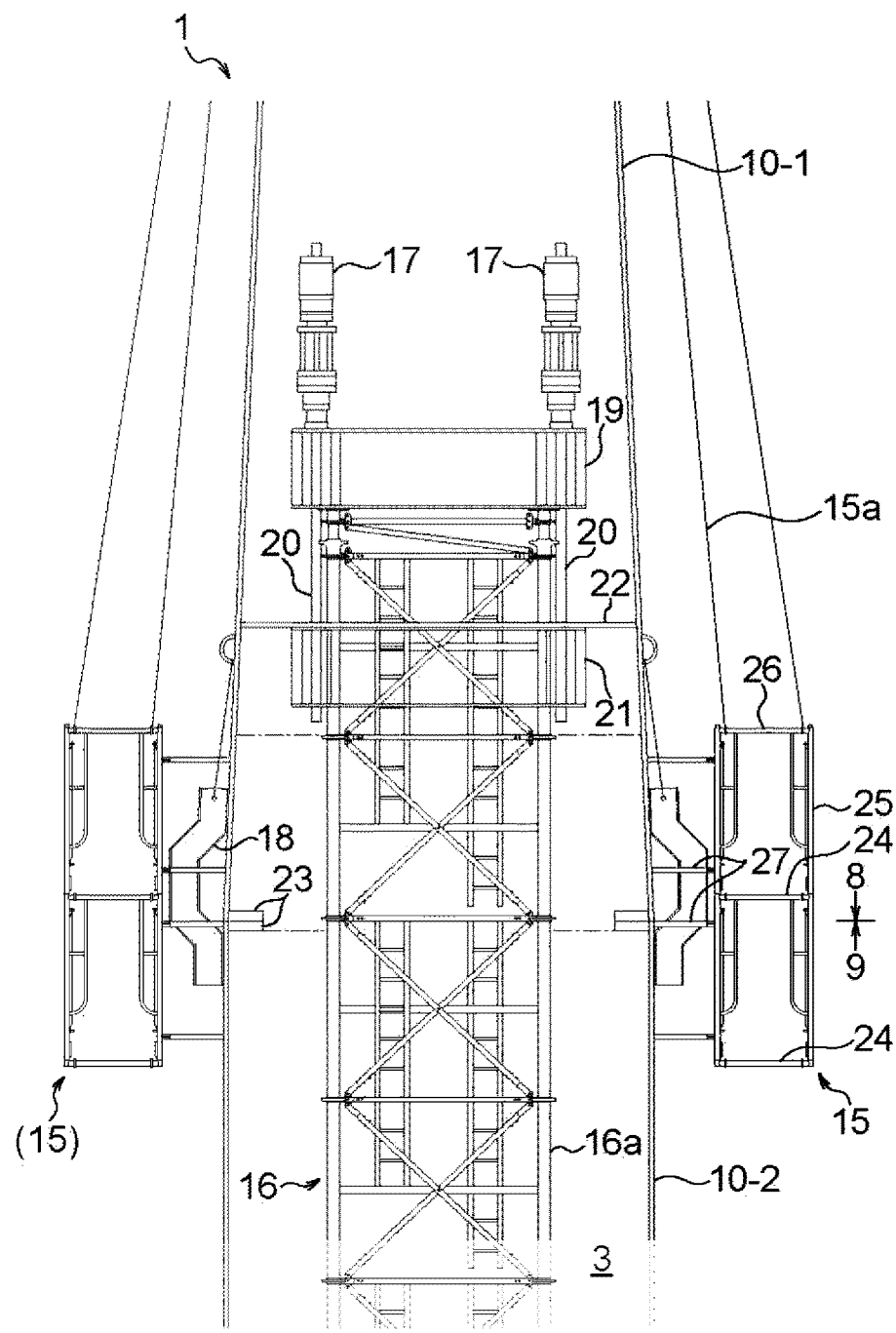
FIG. 4 is an explanatory view of the dismantling method of the tower-type wind power generation system of FIG. 1.

FIG. 4 illustrates a configuration of the tower-type wind power generation system, specifically, a configuration thereof before the start of dismantling of the tower body 1. As is clear from FIG. 4, in the internal cavity 3 of the tower body 1, the inner column 16 continuing from a lower end region (not illustrated) to the upward-tapering part 8, that is, a region below the wind power generator 2, is built by stacking the foldable scaffolding members 16a (inner column building step). Additionally, the work bench 15 surrounding the tower body 1 is suspended in a liftable manner on the outside of the outer wall of a connection part between the upward-tapering part 8 and an upper end part of the cylindrical part 9 of the tower body 1 (work bench setting step). The work bench 15 is built by assembling scaffolding members, whose details will be described later. FIG. 4 illustrates a state immediately before dismantling of the tower body 1, and the upward-tapering part 8 and the cylindrical part 9 are still coupled together. A coupling member 18 extending in the vertical direction is coupled to the lower end part of the upward-tapering part 8 and the upper end part of the cylindrical part 9, and the coupling member 18 is suspended from the upward-tapering part 8. The coupling member 18 is formed firmly using an H beam, for example.

Figure 5:
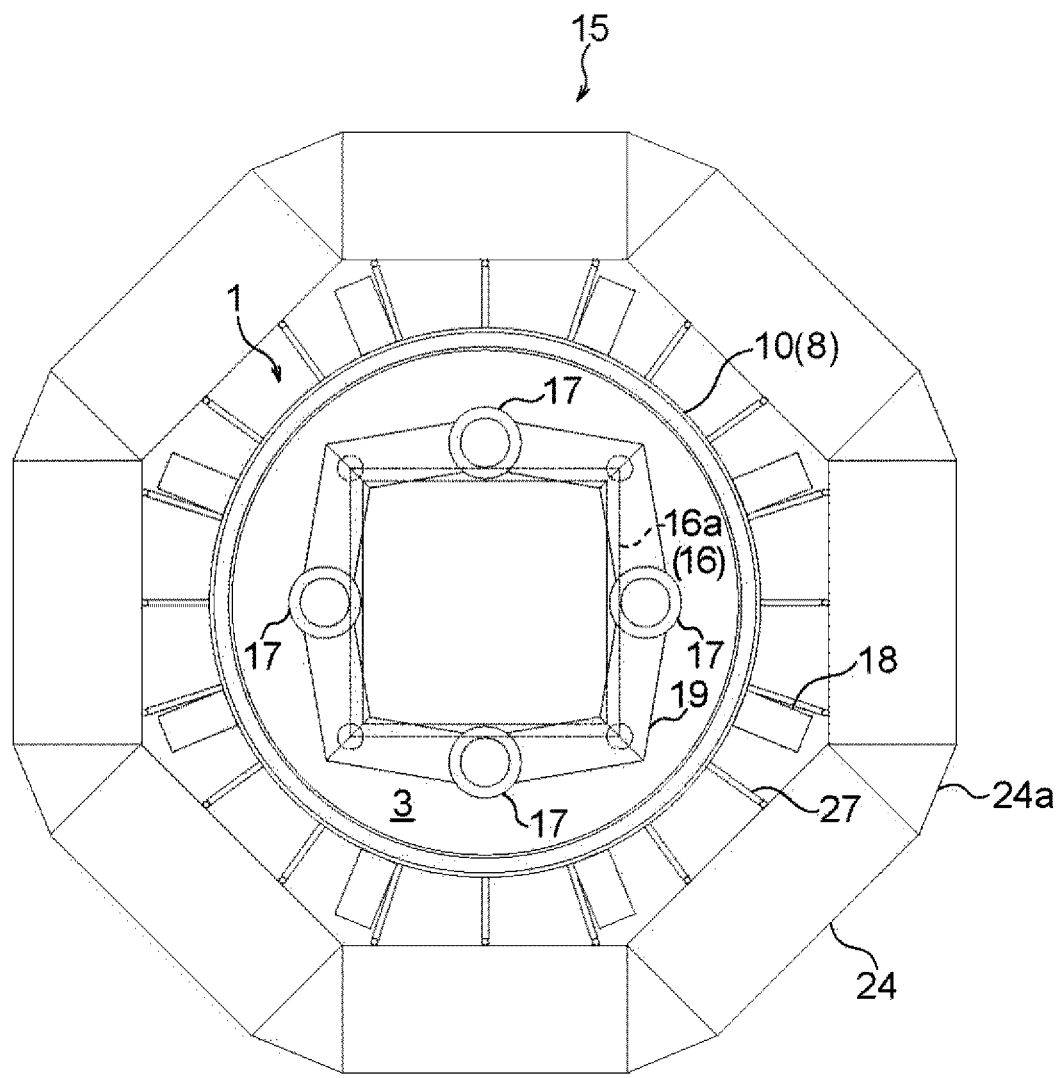
FIG. 5 is a plan view of a work bench used in the dismantling method of the tower-type wind power generation system of FIG. 1.

FIG. 5 is a plan view in which the upward-tapering part 8 in an upper end part of FIG. 4 is cut in the horizontal direction and viewed from above. As is clear from FIGS. 4 and 5, four jacks 17 are mounted on an upper surface of a frame 19 built from H beams and having an octagonal shape in plan view, for example, at the upper end of the inner column 16. The jack 17 is capable of moving a suspended heavy load in the vertical direction or holding the heavy load in the suspended state, for example, by adding or removing vertically extending step rods 20 in the vertical direction. A supporting base 21 built from H beams, for example, is coupled to a lower end part of the step rods 20, and a disk-shaped abutting support member 22 is mounted and fixed to an upper surface of the supporting base 21.

The disk-shaped abutting support member 22 is formed of a steel sheet having a thickness of about 40 mm, for example, and has a circular outer peripheral surface equivalent (in radius or diameter) to an inner wall somewhat above the lower end part of the upward-tapering part 8. When the disk-shaped abutting support member 22 is suspended upward together with the supporting base 21 by the jack 17 from the lower end part of the upward-tapering part 8, the circular outer peripheral surface of the abutting support member 22 abuts on the inner wall of the upward-tapering part 8 having the same radius or diameter, and is unable to go up any further. That is, the jack 17 can give the upward-tapering part 8 an upward supporting force for supporting the load of the entire system above the upward-tapering part 8 at the abutting part of the abutting support member 22 (tower body-upper part supporting step). In that state, when a part between upper and lower alternate long and short dashed lines in FIG. 4, for example, of the lower end part of the upward-tapering part 8 is cut and removed (dismantled), the load of the entire system above the remaining upward-tapering part 8 is supported by the jack 17 via the abutting support member 22 and the supporting base 21.

Note that the abutting support member 22 does not necessarily need to have a circular outer shape. That is, the abutting support member 22 abuts on an inner wall of the upward-tapering part 8 that tapers upward as in the case of the outer shape thereof, and projects against the inner wall of the upward-tapering part 8 without moving up any further. Hence, the abutting support member 22 only needs to have, in its outer shape, at least two (defined in positions in diameter direction of internal cavity 3 in that case) arc parts equivalent (in radius or diameter) to the inner wall of the upward-tapering part 8, for example. Note, however, that in order to support the remaining upward-tapering part 8 by the jack 17 stably, it is preferable that there are three or more arc parts. Additionally, the abutting support member 22 may be fixed to the inner wall of the upward-tapering part 8 on which it abuts by separate fixing means.

When dismantling the lower end part of the upward-tapering part 8, it is desirable to perform cutting and removing (dismantling) by including a lower part of a connection part between the upward-tapering part 8 and the top tubular tower body member 10-2. Including the connection part between the upward-tapering part 8 and the top tubular tower body member 10-2, as illustrated in FIG. 4 (also see FIG. 1), the tubular tower body members 10 forming the tower body 1 are connected and fixed to each other via flanges 23 protruding into the tower from a lower end part and an upper end part thereof, by inserting a bolt into the flanges 23 facing each other, and screwing and tightening a nut on the inserted and protruding part of the bolt. As will be described later, the remaining upward-tapering part 8 is lowered into the internal cavity 3 of the cylindrical part 9 while being supported by the jack 17. The reduction ratio of the upward-tapering part 8 toward the upper side is about 20 mm in radius for every 1 m in height of the upward-tapering part 8. Since the distance in the height direction between the upper and lower alternate long and short dashed lines in FIG. 4 is about 2.5 m, the difference between the outer diameter of the cylindrical part 9 and the outer diameter of the lower end part of the dismantled upward-tapering part 8 is about 50 mm in radius. As mentioned earlier, the wall part, that is, the iron shell of the tubular tower body members 10-2 to 10-5 forming the tower body 1 has a thickness of 20 to 40 mm, and therefore the upward-tapering part 8 having an outer diameter reduced by the amount of this thickness can be lowered into the internal cavity 3 of the cylindrical part 9. However, if the flanges 23 for connecting the tubular members are protruding into the internal cavity 3, the upward-tapering part 8 will interfere with the flanges 23 and cannot be lowered into the internal cavity 3 of the cylindrical part 9. Therefore, when cutting and removing the lower end part of the upward-tapering part 8, the cutting and removing is performed by including a lower part of the connection part between the upward-tapering part 8 and the top tubular tower body member 10-2, that is, the connection flanges 23.

Additionally, as illustrated in FIG. 5, the work bench 15 is formed by evenly arranging six rectangular plate-shaped floor board (anti-slip plate) members 24 outside the outer wall of the tower body 1 and coupling them so as to close the gaps therebetween by gap floor board members 24a having a triangular shape in plan view, so that the work bench 15 is provided over the entire outer periphery of the tower body 1 as described earlier. In the embodiment, as illustrated in FIG. 4, upper and lower two floor board members 24 are provided and are coupled together by column members 25 and handrail members 26, and are also fixed to the outer wall of the tower body 1 (upward-tapering part 8 and cylindrical part 9) by wall connecting members 27. Additionally, as described earlier, the work bench 15 is suspended by the wire rope 15a in a liftable manner from the wind power generator 2 (nacelle 5) or the upper end part of the upward-tapering part 8. Note that in the embodiment, as is clear from FIG. 5, a total of eight coupling members 18 coupling the upward-tapering part 8 and the cylindrical part 9 are arranged evenly on the outer periphery of the tower body 1.

Figure 6:
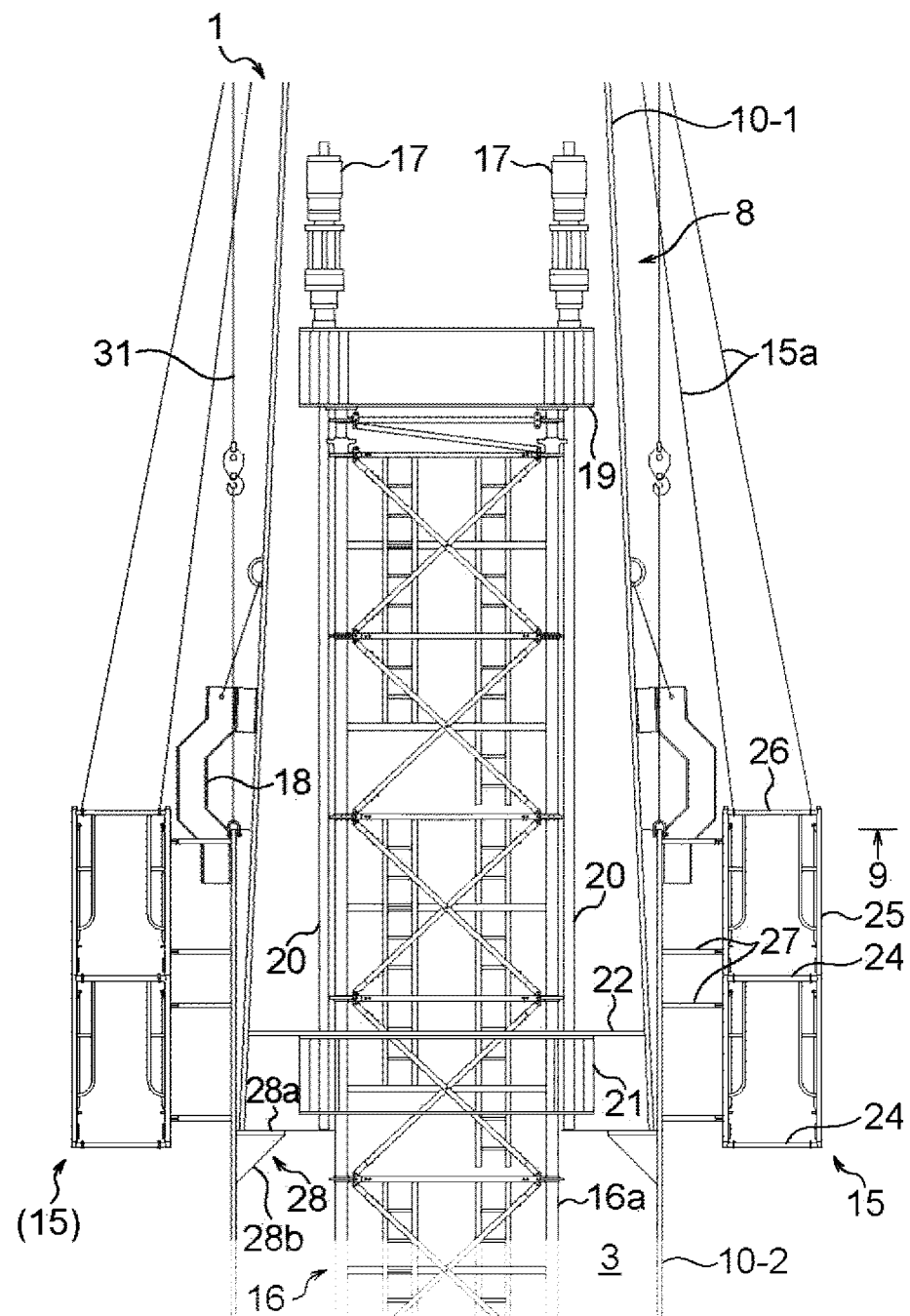
FIG. 6 is an explanatory view of the dismantling method of the tower-type wind power generation system of FIG. 1.

When the lower end part of the upward-tapering part 8 is dismantled as described above, a placement protrusion 28 is attached to the inner wall of the cylindrical part 9 somewhat lower than the upper end part of the cylindrical part 9 as illustrated in FIG. 6. The placement protrusion 28 is formed into a T shape in sectional view by including a horizontal plate member 28a for placing the upward-tapering part 8 and a rib 28b supporting the horizontal plate member 28a from below. In the embodiment, the members described above are attached to eight evenly spaced positions on the inner periphery of the inner wall of the cylindrical part 9 to provide the placement protrusions 28 in a protruding manner on the inner wall. When the placement protrusions 28 are provided in a protruding manner on the inner wall of the cylindrical part 9, the remaining upward-tapering part 8 is lowered into the internal cavity 3 of the cylindrical part 9 by lowering while supporting the abutting support member 22 by the jack 17 in a state where the coupling between the cylindrical part 9 and the upward-tapering part 8 by the coupling member 18 is released, and the lower end part of the upward-tapering part 8 is placed on the placement protrusions 28. By placing the upward-tapering part 8 on the placement protrusions 28, the load of the entire system above the upward-tapering part 8 is received by the cylindrical part 9, and the upward-tapering part 8 is supported stably. Moreover, by lowering the upward-tapering part 8 into the internal cavity 3 of the cylindrical part 9, that is, by storing the upward-tapering part 8 in the cylindrical part 9, it is possible to prevent collapsing of the upward-tapering part 8 by the outer cylindrical part 9. Note that when the upward-tapering part 8 is lowered in the internal cavity 3 of the cylindrical part 9, the upper end part of the cylindrical part 9 and the upward-tapering part 8 is coupled by the coupling member 18 again. Additionally, when lowering the upward-tapering part 8, it is desirable that the wind power generator 2 (nacelle 5) and the upper end part of the cylindrical part 9 be coupled by a wire rope 31, for example.

Figure 7:
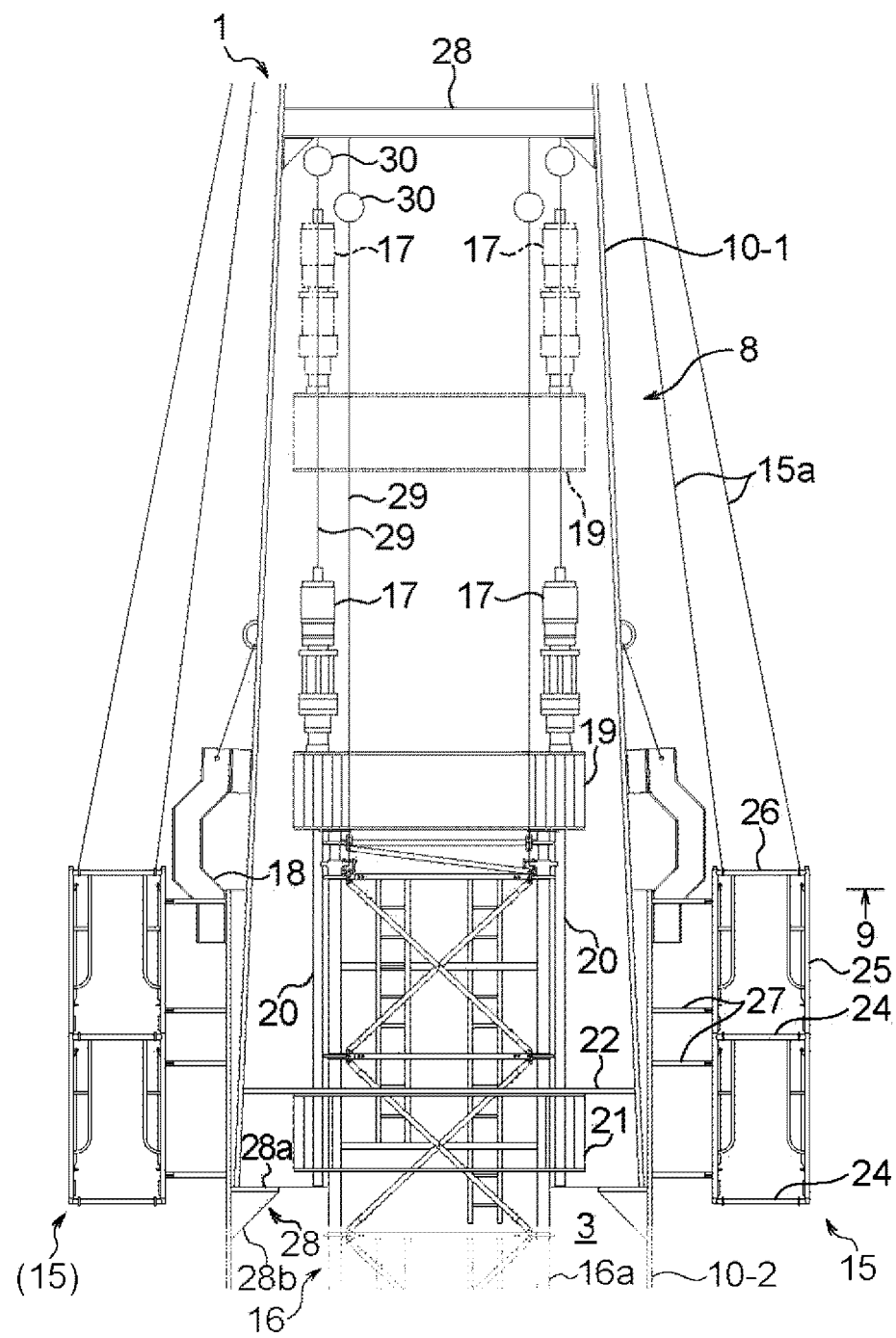
FIG. 7 is an explanatory view of the dismantling method of the tower-type wind power generation system of FIG. 1.

When the upward-tapering part 8 is lowered in this manner, or the upper end part of the cylindrical part 9 is sequentially dismantled from the top as will be described later, as illustrated in FIG. 6, the inner column 16 protrudes higher than the cylindrical part 9. If the inner column 16 protrudes higher than the cylindrical part 9, when the remaining upward-tapering part 8 is lowered as described above, the upper end part of the inner column 16 may interfere with the wind power generator 2 lowered together with the upward-tapering part 8. Also, although the jack 17 can add step rods 20 to lower the supporting base 21 and the upward-tapering part 8 supported thereon by a large amount, excessively long step rods 20 may cause instability. Therefore, as illustrated in FIG. 7, a reinforcement member 28 such as a beam member is attached to the inner wall of the upward-tapering part 8 in a position higher than the upper end part of the inner column 16, and the inner column 16 and the jack 17 are suspended by a crane 30 such as a wire rope 29 attached to the reinforcement member and a winch. Although the heavy jack 17 and the inner column 16 are suspended separately in the embodiment, since the inner column 16 is more important, the inner column 16 alone may be suspended with the jack 17 attached thereto.

When the inner column 16 is suspended from the upward-tapering part 8 in this manner, a lower end part (not illustrated) of the inner column 16 is removed. Since the inner column 16 is built from foldable scaffolding members 16a in the embodiment, the foldable scaffolding member 16a at the bottom corresponding to the lower end part of the inner column 16, for example, is detached and folded to be carried out of the tower body 1 from the opening 14. When the lower end part of the inner column 16 is removed in this manner, the inner column 16 and the jack 17 are lowered using the crane 30, and the lower end part of the inner column 16 is placed on the ground in the internal cavity 3 and fixed. As a result, the upper end part of the inner column 16 is lowered from the position of the alternate long and two short dashes line (frame 19 and jack 17 are shown in FIG. 7) to the position of the solid line and shortened, so that interference with the wind power generator 2 lowered together with the upward-tapering part 8 is avoided.

Figure 8:
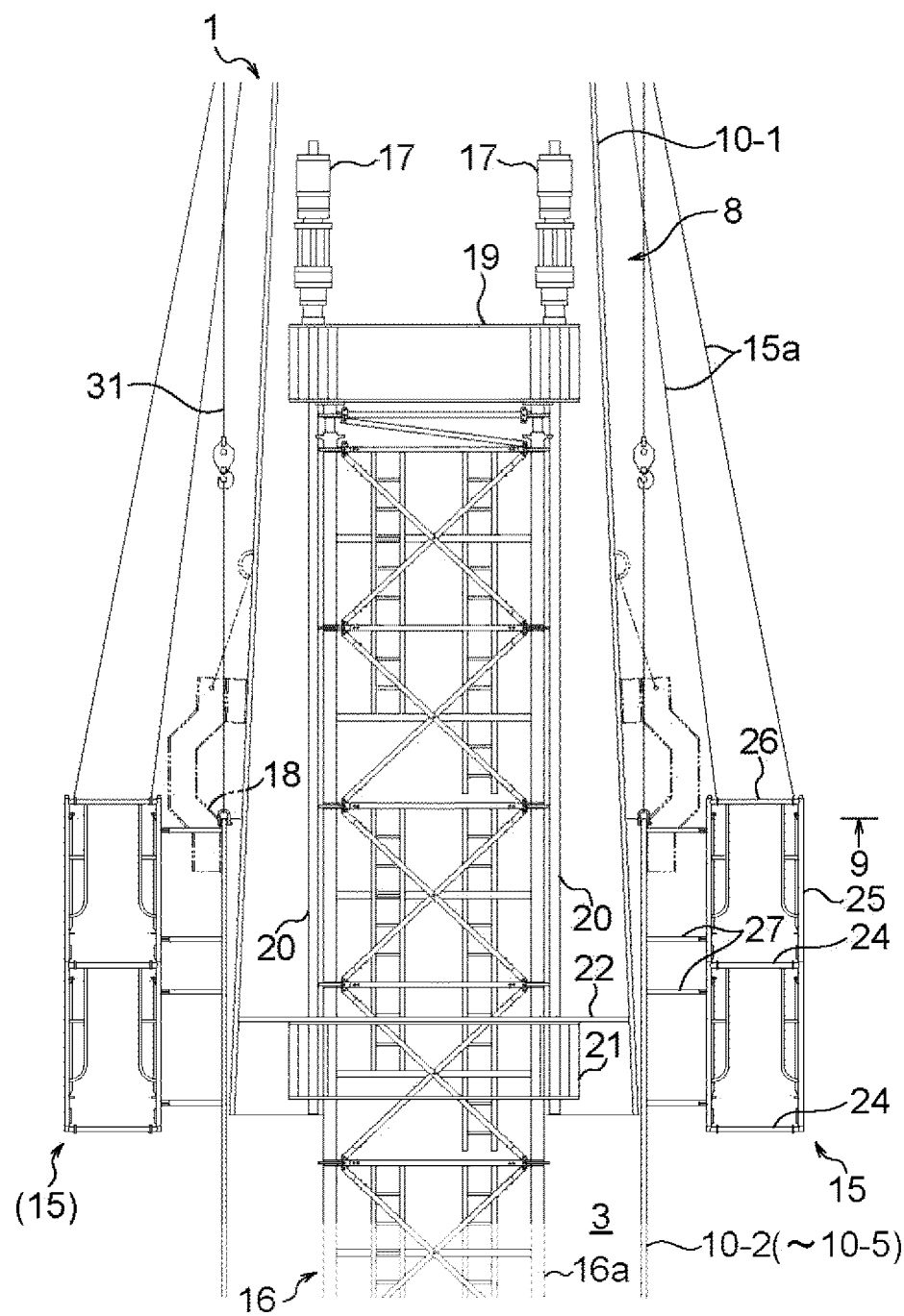
FIG. 8 is an explanatory view of the dismantling method of the tower-type wind power generation system of FIG. 1.

When the dismantling of the lower end part of the upward-tapering part 8 is completed and the upward-tapering part 8 is lowered into the internal cavity 3 of the cylindrical part 9 as described above, the uppermost part of the cylindrical part 9 is sequentially cut and removed from the outside of the tower body 1 using the work bench 15, and the dismantled objects are lowered from the outside of the tower body 1 using the lift 13. To sequentially dismantle the uppermost part of the cylindrical part 9, the work bench 15 that had been arranged in the uppermost part of the cylindrical part 9 also needs to be lowered sequentially. Hence, as in the case of FIG. 6, every time the dismantling of the uppermost part of the cylindrical part 9 is completed, the remaining upward-tapering part 8 is lowered using the jack 17 as illustrated in FIG. 8, the upward-tapering part 8 is placed on the placement protrusions 28 of FIG. 6, and also the work bench 15 suspended from the wind power generator 2 or the upper end part of the upward-tapering part 8 is lowered to the uppermost part of the cylindrical part 9 and then fixed to the outer wall by the wall connecting member 27. When the work bench 15 is fixed in this manner, the uppermost part of the cylindrical part 9 is cut and removed (dismantled) at the fixed position, this operation is repeated consecutively, and the remaining upward-tapering part 8 is lowered to the ground as in the last step in FIG. 3. As mentioned earlier, the remaining upward-tapering part 8 lowered to the ground may be dismantled, or may be carried out without dismantling. Note that if the coupling member 18 gets in the way when lowering the remaining upward-tapering part 8, as indicated by an alternate long and two short dashes line in FIG. 8, for example, the coupling member 18 may be detached temporarily. Then, when the upward-tapering part 8 is placed on the placement protrusions 28 of FIG. 6, the upper end part of the cylindrical part 9 and the remaining upward-tapering part 8 may be coupled by the coupling member 18 again. Additionally, the wind power generator 2 including the blades 6 may be dismantled at an appropriate timing.

As described above, in the dismantling method of a tower-type wind power generation system of the embodiment, in a state where the upward-tapering part 8 in the upper end part of the tower body 1 is supported by the jack 17 in an upper part of the inner column 16 via the abutting support member 22, when a predetermined region of the upward-tapering part 8 lower than an abutting position of the abutting support member 22 is cut and removed while climbing on the work bench 15 suspended outside the outer wall of the tower body 1, the remaining upward-tapering part 8 on the upper side is separated from the tower body 1 (cylindrical part 9) on the lower side. When the separated remaining upward-tapering part 8 is lowered by the jack 17 and its lower end part is placed on the placement protrusions 28 provided in a protruding manner on the inner wall of the remaining tower body 1 (cylindrical part 9), the remaining upward-tapering part 8 is stored in the remaining tower body 1 (cylindrical part 9). Hence, collapsing of the upward-tapering part 8 is prevented, and the load of the upward-tapering part 8 is received by the remaining tower body 1 (cylindrical part 9), so that the upward-tapering part 8 is supported stably. In that state, the predetermined range of the uppermost part of the remaining tower body 1 (cylindrical part 9) is removed over the entire periphery of the tower body on the work bench 15, and along with this operation, the lower end part of the inner column 16 is removed while suspending the inner column 16 from the remaining upward-tapering part 8 and then the inner column 16 is lowered to the ground in the internal cavity 3. By repeating this with lowering of the remaining upward-tapering part 8, it is possible to sequentially dismantle the remaining tower body 1 (cylindrical part 9) from the top. As a result, when the remaining upward-tapering part 8 is lowered to the ground, the upward-tapering part 8 may be dismantled or carried out to complete the dismantling of the tower-type wind power generation system. During this operation, there is no need to use a large crane, and both the remaining tower body 1 (cylindrical part 9) and the remaining upward-tapering part 8 are stable. Accordingly, there is no difficulty in the dismantling operation, there is no need to stop the dismantling operation frequently, and dismantling can be done by a simple operation, whereby the work period can be shortened.

Additionally, when the cylindrical part 9 of the remaining tower body 1 is sequentially dismantled and removed from the uppermost part, the inner column 16 alone protrudes upward from the remaining tower body 1 (cylindrical part 9). However, by suspending the inner column 16 from the remaining upward-tapering part 8 and removing the lower end part of the inner column 16, and then lowering the inner column 16 to the ground of the internal cavity 3, the upper end part of the inner column 16 can by lowered by this amount. Additionally, as a result, interference between the wind power generator 2 lowered together with the upward-tapering part 8 and the upper end part of the inner column 16 can be avoided.

Additionally, by coupling the remaining upward-tapering part 8 and the upper end part of the cylindrical part 9 by the coupling member 18, collapsing of the remaining upward-tapering part 8 is prevented and stability is ensured.

Additionally, by arranging the work bench 15 over the entire outer periphery of the tower body 1, when dismantling the cylindrical part 9 of the tower body 1 on the work bench 15 from outside the tower body 1, the work environment is stabilized and the dismantling operation can be performed efficiently.

Additionally, by forming the opening 14 for carrying in equipment in the lower end part of the tower body 1, it is possible to carry in the inner column 16 members and the jack 17 from the opening 14, and building of the inner column 16 in the tower body 1 and setting (movement) of the jack 17 to the upper part of the inner column 16 can be facilitated.

Additionally, since the upward-tapering part 8 of the tower body 1 and the cylindrical part 9 provided immediately therebelow are often coupled together via the flanges 23 protruding into the tower from the inner wall of the tower body 1, by performing removing in the tower body upper end removing step by including the lower part of the connection part, it is possible to remove the flanges 23 protruding into the tower. As a result, when lowering the remaining upward-tapering part 8 into the cylindrical part 9, it can be lowered smoothly while avoiding interference with the flanges 23.

While the dismantling method of a tower-type wind power generation system according to the embodiment has been described above, the present invention is not limited to the configuration described in the embodiment, and various modifications can be made within the gist of the present invention. For example, while the work bench 15 arranged outside the outer wall of the tower body 1 is suspended from the upper end part of the upward-tapering part 8 or the wind power generator 2, that is, the upper part of the tower body 1 and fixed to the outer wall of the tower body 1 in the embodiment, the work bench 15 can be set by only suspending in a liftable manner from the upper part of the tower body 1, for example. However, to support the work bench 15 stably, it is desirable to use both methods. Additionally, other support methods are applicable.

Additionally, while only the tower-type wind power generation system in which only the upper end part of the tower body is tapered upward and the part therebelow is cylindrical is targeted for dismantling in the embodiment, the dismantling method of a tower-type wind power generation system of the present invention is similarly applicable to a tower body that tapers upward from its lower end part to its upper end part. In this case, it is necessary to increase the degree of protrusion from the inner wall of the placement protrusion 28 on which the upward-tapering part is placed, or to locate the placement position away from the inner wall.

REFERENCE SIGNS LIST

1 tower body
2 wind power generator
3 internal cavity
8 upward-tapering part
9 cylindrical part
13 lift
14 opening
15 work bench
16 inner column
17 jack
18 coupling member
22 abutting support member
23 flange
28 placement protrusion

The invention claimed is:

1. A dismantling method of a tower type tower wind power generation system including a hollow tower body and a wind power generator provided in an upper end part of the hollow tower body, an upward-tapering part provided in the upper end part of the hollow tower body, the method comprising:

an inner column building step of building an inner column extending to an upper side of a lower end part of the upward-tapering part inside an internal cavity of the hollow tower body;

a tower body-upper part supporting step of applying an upward supporting force equal to or larger than a load of an entire system above the upward-tapering part to the upward-tapering part by a jack provided in an upper part of the inner column via an abutting support member that abuts on a predetermined position on an inner wall of the upward-tapering part of the hollow tower body;

a work bench setting step of suspending a work bench on which a worker can climb and perform work from an upper part of the hollow tower body in a liftable manner;

a tapering part-lower part removal step of cutting and removing, over an entire periphery of the hollow tower body, a predetermined region lower than an abutting position of the abutting support member of the upward-tapering part in a supported state by an operation on the work bench;

a tapering part lowering and placing step of, after the tapering part-lower part removal step, lowering and placing, by the jack, a remaining upward-tapering part on a placement protrusion on which an entire system above the upward-tapering part is placeable provided in a protruding manner on an inner wall of the hollow tower body remaining on a lower side;

an uppermost part of lower part removal step of using the work bench to cut and remove a predetermined range of an uppermost part of the hollow tower body remaining on a lower side over an entire periphery of the hollow tower body after the tapering part-lower part removal step;

an inner column shortening step of removing a lower end part of the inner column in a state where the inner column is suspended from a remaining upward-taper-ing part and lowering the inner column from which the lower end part is removed on a ground in the internal cavity; and a lowering and removal repeating step of repeating the tapering part lowering and placing step, the uppermost part of lower part removal step, and the inner column shortening step.

2. The dismantling method of a tower wind power generation system according to claim 1, wherein
the uppermost part of lower part removal step includes a step of coupling a remaining tower body upper end part and an upper end part of a remaining tower body by a coupling member.

3. The dismantling method of a tower wind power generation system according to claim 2, wherein
the work bench setting step sets the work bench over an entire outer periphery of the hollow tower body.

4. The dismantling method of a tower wind power generation system according to claim 2 further comprising an opening forming step of forming an opening for carrying in equipment in a lower end part of the hollow tower body before the inner column building step.

5. The dismantling method of a tower wind power generation system according to claim 2, wherein
in a case where an upward-tapering part is provided only in an upper end part of the hollow tower body and a part below the upward-tapering part is cylindrical, the pre-determined region includes a part below a connection part between the upward-tapering part and a cylindrical part of the hollow tower body.

6. The dismantling method of a tower wind power generation system according to claim 1, wherein
the work bench setting step sets the work bench over an entire outer periphery of the hollow tower body.

7. The dismantling method of a tower wind power generation system according to claim 6 further comprising an opening forming step of forming an opening for carrying in equipment in a lower end part of the hollow tower body before the inner column building step.

8. The dismantling method of a tower wind power generation system according to claim 6, wherein
in a case where an upward-tapering part is provided only in an upper end part of the hollow tower body and a part below the upward-tapering part is cylindrical, the pre-determined region includes a part below a connection part between the upward-tapering part and a cylindrical part of the hollow tower body.

9. The dismantling method of a tower wind power generation system according to claim 1 further comprising an opening forming step of forming an opening for carrying in equipment in a lower end part of the hollow tower body before the inner column building step.

10. The dismantling method of a tower wind power generation system according to claim 9, wherein
in a case where an upward-tapering part is provided only in an upper end part of the hollow tower body and a part below the upward-tapering part is cylindrical, the pre-determined region includes a part below a connection part between the upward-tapering part and a cylindrical part of the hollow tower body.

11. The dismantling method of a tower wind power generation system according to claim 1, wherein
in a case where an upward-tapering part is provided only in an upper end part of the hollow tower body and a part below the upward-tapering part is cylindrical, the pre-determined region includes a part below a connection part between the upward-tapering part and a cylindrical part of the hollow tower body.

\* \* \* \* \*